(12) United States Patent
Bohli et al.

(10) Patent No.: US 11,717,880 B2
(45) Date of Patent: Aug. 8, 2023

(54) METHOD FOR FORMING A WAX MODEL FOR A TURBINE BLADE

(71) Applicant: SAFRAN, Paris (FR)

(72) Inventors: Ramzi Bohli, Moissy-Cramayel (FR); Mirna Bechelany, Moissy-Cramayel (FR); Didier Dangeul, Moissy-Cramayel (FR); Didier Maurice Marceau Guerche, Moissy-Cramayel (FR); Alain Armel Le Hegarat, Moissy-Cramayel (FR); Ngadia Taha Niane, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 17/596,122

(22) PCT Filed: Jun. 3, 2020

(86) PCT No.: PCT/HR2020/050942
§ 371 (c)(1),
(2) Date: Dec. 3, 2021

(87) PCT Pub. No.: WO2020/245539
PCT Pub. Date: Dec. 10, 2020

(65) Prior Publication Data
US 2022/0314304 A1    Oct. 6, 2022

(30) Foreign Application Priority Data

Jun. 5, 2019 (FR) ........................................ 1905967

(51) Int. Cl.
*B22C 7/02* (2006.01)
*B33Y 80/00* (2015.01)

(52) U.S. Cl.
CPC ................ *B22C 7/02* (2013.01); *B33Y 80/00* (2014.12)

(58) Field of Classification Search
CPC .................................... B22C 7/00; B22C 7/02
See application file for complete search history.

(56) References Cited

FOREIGN PATENT DOCUMENTS

| CN | 106734885 A | 5/2017 |
|----|-------------|--------|
| CN | 108015224 A | 5/2018 |
| EP | 0559521 A1  | 9/1993 |

(Continued)

OTHER PUBLICATIONS

French Search Report issued in FR1905967 dated Feb. 6, 2020 (2 pages).

(Continued)

*Primary Examiner* — Kevin P Kerns
*Assistant Examiner* — Steven S Ha
(74) *Attorney, Agent, or Firm* — Bookoff McAndrews, PLLC

(57) ABSTRACT

A method for forming a wax model for the manufacture of turbine blades by lost-wax casting, in which a core is provided, a lower surface shell and an upper surface shell are positioned and bonded on either side of ducts of the core adjacent to the root, the core equipped with the lower surface shell and with the upper surface shell is positioned in an injection mold, wax is injected around the core equipped with the lower surface shell and with the upper surface shell, so as to form a wax model including a blade airfoil and a blade root including a fir tree, the lower surface shell and the upper surface shell being positioned around the core so as to form a portion of the fir tree of the wax model.

7 Claims, 5 Drawing Sheets

(56) References Cited

FOREIGN PATENT DOCUMENTS

| | | |
|---|---|---|
| EP | 0873803 A1 | 10/1998 |
| EP | 3162459 A1 | 5/2017 |
| JP | H03-005040 A | 1/1991 |

OTHER PUBLICATIONS

International Search Report issued in PCT/FR2020/050942 dated Aug. 18, 2020 (4 pages).
English Translation of Office Action issued in corresponding Chinese Application No. 2020800409727, dated Apr. 15, 2023.

[Fig. 1]
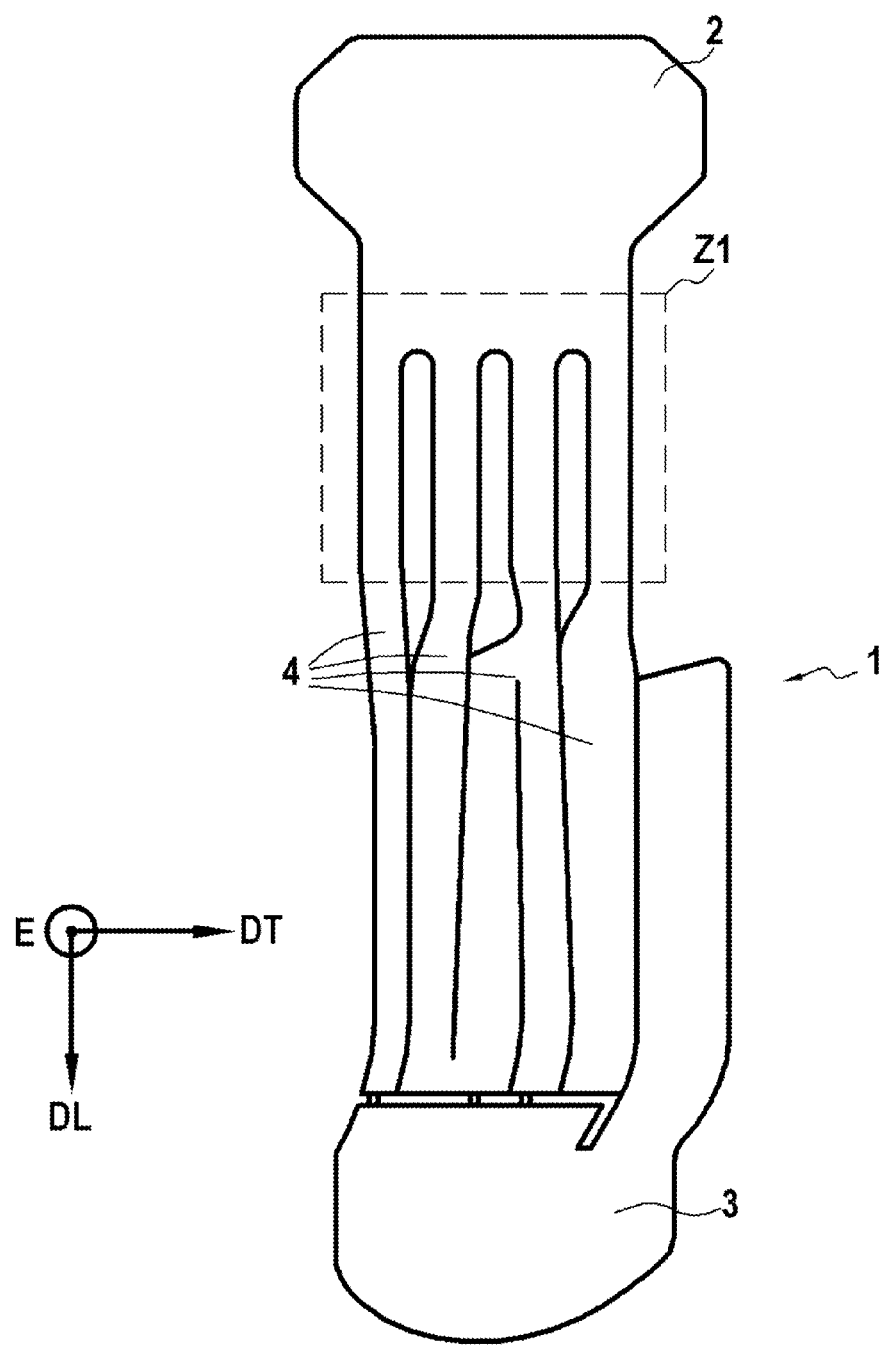

[Fig. 2]
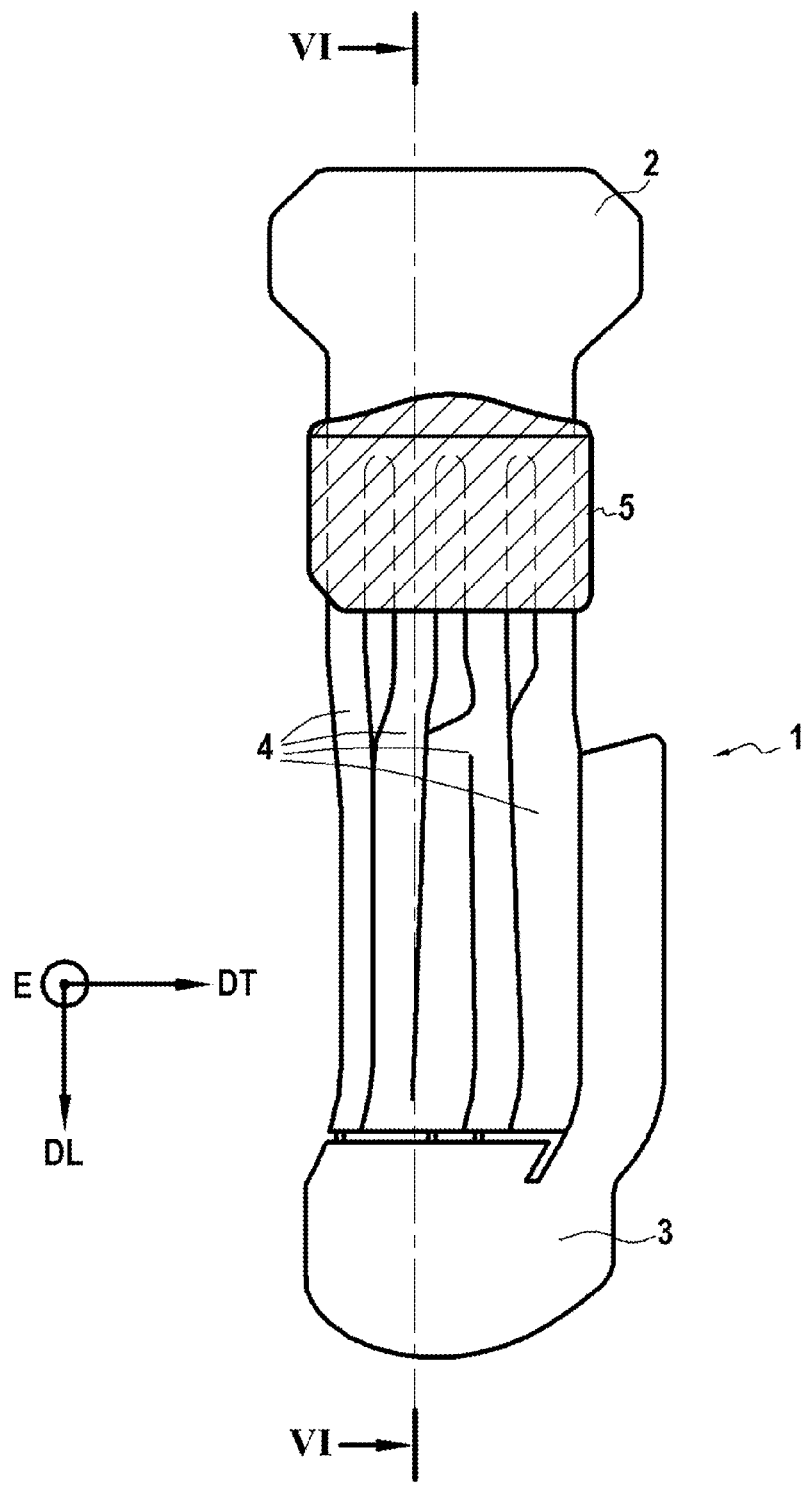

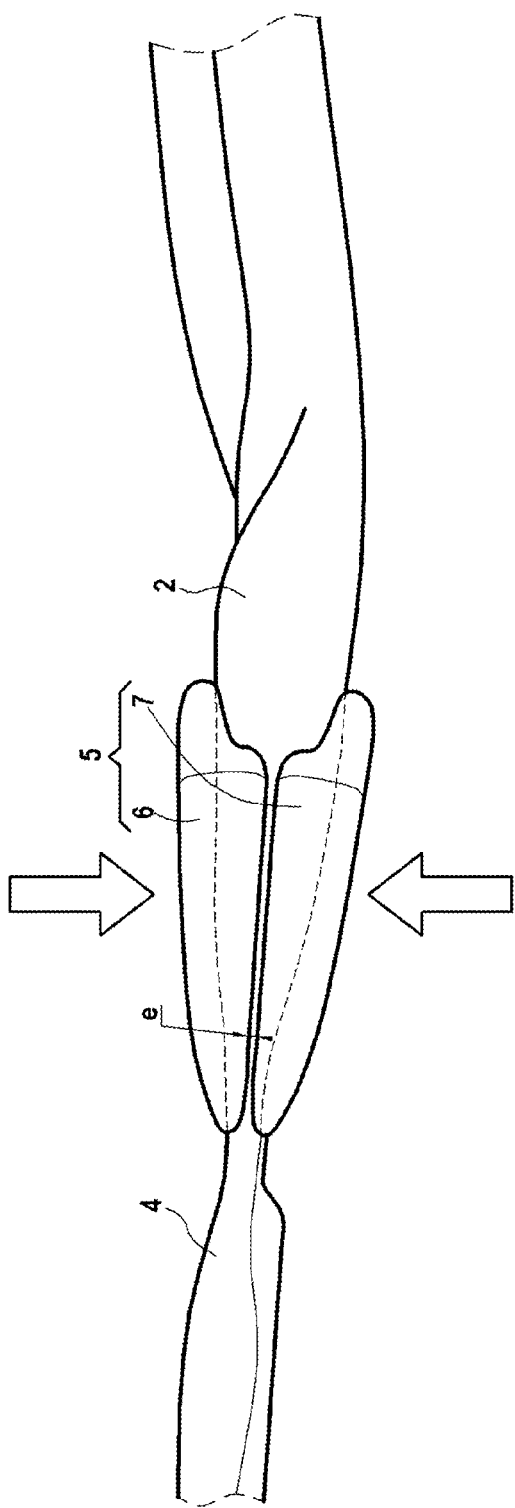
[Fig. 3]

[Fig. 4]
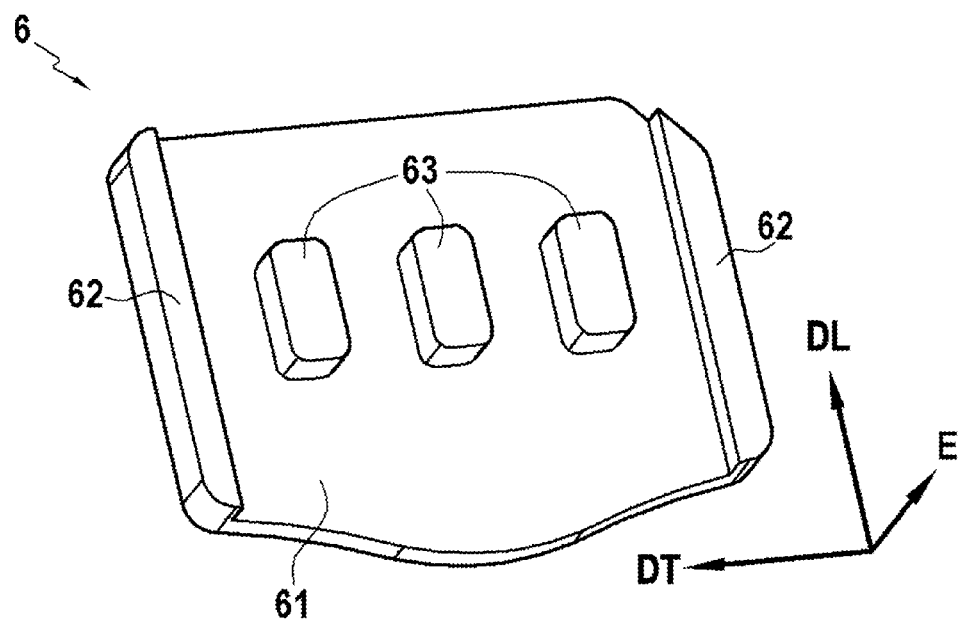
[Fig. 5]
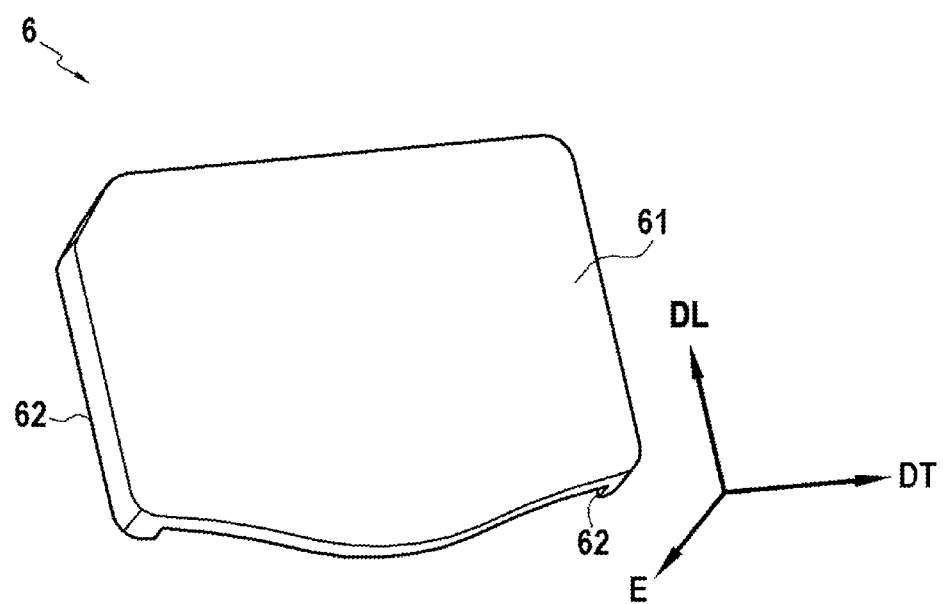

[Fig. 6]
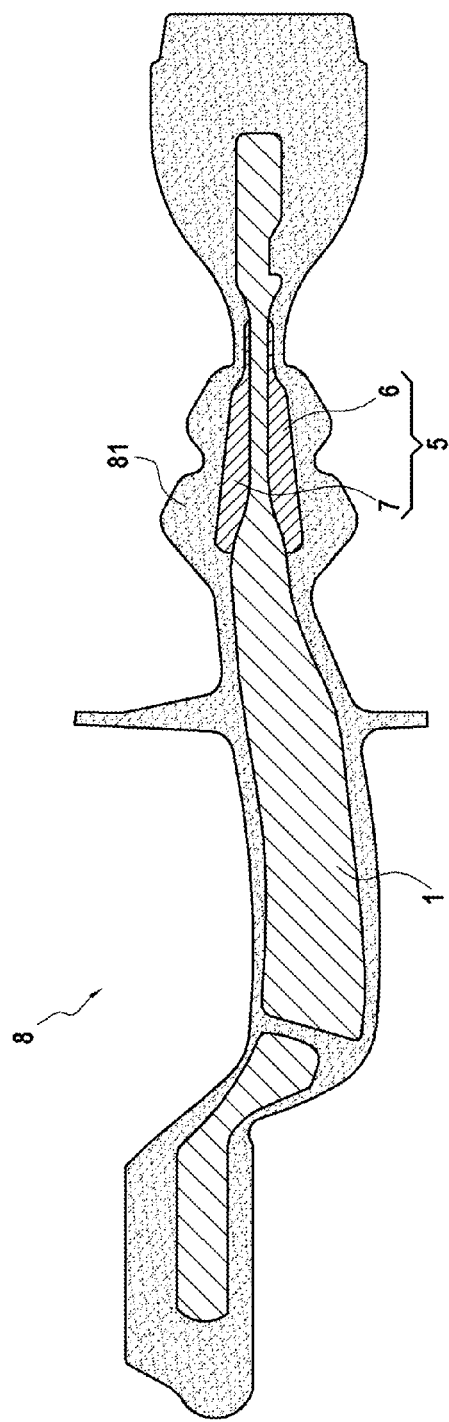

METHOD FOR FORMING A WAX MODEL FOR A TURBINE BLADE

TECHNICAL FIELD

The present disclosure relates to the field of turbomachines, and relates more precisely to manufacturing techniques for wax models for the manufacture of turbomachine blades by means of lost-wax casting.

PRIOR ART

The manufacture of turbomachine blades is commonly accomplished by means of lost-wax casting due in particular to the advantages of this method in terms of tolerances and accuracy.

However, the evolution of cooling circuits within blades imposes thinner and thinner supply cavities, which causes a reduction in the thickness of the cores employed for manufacturing wax models, to thicknesses on the order of 0.06 mm. Due to these very small thicknesses, a very high rate of breakage of the core is observed during the wax injection for the formation of the model, in particular for the formation of the fir tree of the wax model of the blade.

The present disclosure thus seeks to propose a solution allowing at least a partial response to this problem.

Disclosure of the Invention

To this end, the present invention proposes a method for forming a wax model for the manufacture of turbine blades by lost-wax casting, in which: a core is provided, defining ducts extending between a root and a tip; a lower surface shell and an upper surface shell are provided; the lower surface shell and the upper surface shell are positioned on either side of ducts of the core adjacent to the root; the lower surface shell and the upper surface shell are bonded around the core; the core equipped with the lower surface shell and with the upper surface shell is positioned in an injection mold; wax is injected around said core equipped with the lower surface shell and with the upper surface shell, so as to form a wax model comprising a blade airfoil and a blade root comprising a fir tree, the lower surface shell and the upper surface shell being positioned around the core so as to form a portion of the fir tree of the wax model.

According to one example, the lower surface shell and the upper surface shell are manufactured of wax or of polymer.

According to one example, the lower surface shell and the upper surface shell are positioned around the core and are each in contact with said core, and in which the lower surface shell and the upper surface shell are positioned so as to define a clearance comprised between 0.05 and 0.2 mm between them.

As a variant, the lower surface shell and the upper surface shell are positioned around the core and are in contact with one another, the lower surface shell and the upper surface shell being dimensioned so as to allow a travel comprised between 0.05 and 0.2 mm relative to the core prior to their boding around the core.

According to one example, the core comprises at least 3 ducts extending between a root and a tip, and in which the lower surface shell and/or the upper surface shell comprise bosses suited to be inserted between said ducts, so as to index said shell relative to the ducts.

According to one example, the lower surface shell and the upper surface shell are positioned around the core in a region of the core in which the wax model comprises walls having a thickness comprised between 1 and 10 times the thickness of the ducts of the core.

According to one example, said method comprises a prior step of manufacturing the lower surface shell and the upper surface shell by additive manufacturing.

BRIEF DESCRIPTION OF THE DRAWINGS

The invention and its advantages will be better understood upon reading the detailed description given below of different embodiments of the invention given by way of non-limiting examples. This description refers to the appended figure pages, in which:

FIG. 1 shows an example of a core for a method according to one aspect of the invention.

FIG. 2 shows another view of an example of a core equipped with a shell for a method according to one aspect of the invention.

FIG. 3 shows another view of an example of a core equipped with a shell for a method according to one aspect of the invention.

FIG. 4 is a view of a shell according to one aspect of the invention.

FIG. 5 is another view of a shell according to one aspect of the invention.

FIG. 6 shows a section view of a ceramic core around which a wax model has been poured.

In all the figures, common elements are labeled with identical numerical references.

DESCRIPTION OF THE EMBODIMENTS

FIG. 1 shows an example of a core 1, typically made of ceramics, for a method according to one aspect of the invention.

The core 1 as shown comprises a root 2 and a tip 3 between which extend a plurality of ducts 4. In the example illustrated, the core 1 comprises 4 ducts. It is understood that this example is not limiting, and that the present disclosure is directly transposable to a core 1 comprising any number of ducts. A longitudinal direction DL, which corresponds the direction running from the root 2 to the tip 3, a transverse direction DT, running in the plane of FIG. 1 and perpendicular to the longitudinal direction DL, and a thickness E, measured in a direction perpendicular to a plane defined by the transverse direction DT and the longitudinal direction DL, are defined for the core 1. More generally, the longitudinal direction DL is defined by the length of the core 1, the transverse direction DT defines its width, and the thickness E its thickness.

The core 1 is intended to be positioned in a wax injection mold, for the purpose of the formation of a wax model of a turbine blade, in order to define the internal ducts of the blade.

During the formation of the wax model, the zone labeled by the reference Z1 in FIG. 1 poses problems for a good formation of the model. This zone Z1 corresponds in effect to a zone of the blade root which is qualified as a "fir tree" or "fir tree base" having walls having considerable thickness, which can for example be 10 times as great as the thickness of the walls of the blade in the other regions of the blade.

Such thickness variations cause considerable problems of material shrinkage during cooling, which generates high stresses on the core manufactured by means of the wax model, and therefore tends to generate cracks in the core.

Moreover, the greater quantity of material in this region will cause higher stresses on the core 1 during the injection, which can cause it to rupture.

The proposed method thus seeks to position a shell around the zone Z1, this shell having a dual function of protecting the core 1 and preventing the formation of malformations or cracks in the wax model.

FIGS. 2 and 3 thus illustrate the core 1 as presented in FIG. 1, which here is equipped with a shell 5. The shell 5 as presented comprises a lower surface shell 6 and an upper surface shell 7, which are positioned respectively on the lower surface face and on the upper surface face of the core 1, the designations lower surface and upper surface being defined based on the geometry of the desired blade. As a variant, the shell 5 can comprise more than two components, provided that it allows surrounding at least partially a region of the core 1 as well be seen hereafter, the geometry of the shell 5 being adapted depending on the geometry of the core 1.

The lower surface shell 6 and the upper surface shell 7 are defined so as to at least partially surround the ducts 4 at their junction with the root 2 of the core 1. More precisely, the lower surface shell 6 and the upper surface shell 7 are positioned so as to surround at least partially the ducts 4 over a portion of their length (the length being measured in a direction running from the root 2 to the tip 3 of the core 1), and typically to cover a portion of the root 2 of the core 1 from which the ducts 4 extend.

FIGS. 4 and 5 show an example of a portion of the shell 5, either of these figures being able to show a lower surface shell 6 or an upper surface shell 7. For the sake of description, it will be considered here that it is the lower surface shell 6, the associated upper surface shell 7 then being able to be identical or distinct, the common elements being designated by the same numerical reference incremented by 10.

The lower surface 6 as shown comprises a body 61 generally forming a plate of variable thickness, and dimensioned so as to be able to extend over all the ducts 4 of the core 1 in the transverse direction DT (i.e. along the width) of the core 1.

The body 61 has two ends in the transverse direction DT equipped with ribs 62 each extending in the longitudinal direction DL. The body 61 is also typically equipped with bosses 63 extending along the thickness of the lower surface shell 6, and suited to be inserted between two adjacent ducts 4 of the core 1. The ribs 62, for their part, are typically dimensioned so as to partially cover the ends of the ducts 4 in the tangential direction DT.

By positioning two shells 6 and 7 around the core 1, a configuration is thus obtained as shown in FIGS. 2 and 3. As can be seen in the figures, the upper face and the lower face of the region Z1 off the core 1 are covered by shells 6 and 7. The lateral faces of the ends of the core 1 are covered by the ribs 62 and 72 of the shells 6 and 7. The region Z1 of the core 1 is thus partially surrounded by the lower surface shell 6 and the upper surface shell 7.

Once the lower surface shell 6 and the upper surface shell 7 are positioned around the core 1, the latter are typically bonded around the core 1, for example by means of an adhesive, which can be suitable wax.

The core 1 thus equipped with the shell 5 is then positioned in a wax injection mold for manufacturing a wax model of a turbine blade.

This partial surrounding of the core 1 allows it to be protected against the forces generated by the wax injection during the formation of the associated wax model, which thus allows avoiding the risks of rupture of the core during the wax injection.

Moreover, the lower surface shell 6 and the upper surface shell 7 thus positioned around the core 1 will be integrated into the wax model when it is manufactured. Shown in FIG. 6 is an example of a section view of a wax model formed around a core 1 equipped with a lower surface shell 6 and an upper surface shell 7. As will be understood upon seeing this figure, the lower surface shell 6 and the upper surface shell 7 positioned around the core 1 allow reducing the quantity of wax necessary for the formation of the wax model, inasmuch as the shells 6 and 7 will directly form here a portion of the wax model. The zone of the wax model which forms the fir tree or fir tree base of the blade of which the wax model 8 is formed is identified by reference 81, this zone continuing with a zone of the wax model forming an airfoil of the blade of which the wax model 8 is formed. The lower surface shell 6 and the upper surface shell 7 thus form a portion of the fir tree 81 of the wax model 8.

As can be seen in this figure, this region has a considerable thickness compared to other regions of the wax model 8. The shells 6 and 7 form a portion of this thickness, which thus allows reducing the quantity of wax necessary for the manufacture of this region, and therefore limits the formation of cracks resulting from the shrinkage of the wax during its cooling. As a variant, the lower surface shell 6 and the upper surface 7 are typically dimensioned so that the thickness of the wax injected around the shells 6 and 7 for the formation of the wax model is constant or substantially constant.

The lower surface shell 6 and the upper surface shell 7 are typically made of wax or of polymer, the selection of material being accomplished in particular based on its compatibility with the wax used during the injection for manufacturing the wax model 8 of the blade. The material employed must also be able to be eliminated during an operation of withdrawing the wax model or of baking a ceramic shell around the wax model. The lower surface shell 6 and the upper surface shell 7 are typically made by additive manufacturing, for example by the polymerization of a resin under the influence of a laser or a UV light, by projection of drops of material, by projection of a binder on a powder bed, by solidification of powder under the influence of an energy source (laser or electron beam), by melting a filament through a heating nozzle, or by any suitable method, particularly any other suitable additive manufacturing method. The lower surface shell 6 and the upper surface shell 7 can also be manufactured for example by injection simultaneous with the wax model, during an injection operation, the lower surface shell and the upper surface shell made during an operation of this type then being employed for the manufacture of a wax model during a subsequent injection operation. A step N of injecting the lower surface shell 6 and the upper surface shell 7, which can then be used for an injection step N+1, is then accomplished.

The lower surface shell 6 and the upper surface shell 7 are typically configured so as to define a spacing, either between the lower surface shell 6 and the upper surface shell 7 or between said shells 6 and 7 and the core 1. According to one example, the lower surface shell 6 and the upper surface shell 7 are dimensioned so that when each of them is positioned supported against the core 1, a spacing typically comprised between 0.05 and 0.2 mm or typically equal to 0.1 mm is formed between said lower surface 6 and upper surface 7 shells. This embodiment is illustrated in FIG. 3, where a non-zero spacing e is maintained between the lower surface shell 6 and the upper surface shell 7.

As a variant, the lower surface shell 6 and the upper surface shell 7 can be dimensioned so that when they are positioned around the core 1, said shells 6 and 7 are in contact with one another, but then define a travel comprised between 0.05 and 0.2 mm or typically equal to 1 mm relative to the core 1. The lower surface 6 and the upper surface 7 are then typically positioned so that each is spaced by an identical gap relative to the core 1. The lower surface shell 6 and the upper surface shell 7 are then typically positioned so that each is spaced by an identical gap relative to the core 1.

The invention as described therefore proposes to associate a shell with a core for the formation of a wax model of a turbomachine blade. The shell is composed of two elements; a lower surface shell and an upper surface shell. The shell will be integrated into the wax model, in order to reduce the volume of wax necessary for the formation of specific zones of the wax model, in this case the fir tree of the blade root, which allow avoiding the formation of cracks in the core due to the shrinkage of the material of the wax model, and also the risks of rupture of the core due to the considerable quantity of wax in this specific zone.

The invention claimed is:

1. A method for forming a wax model for the manufacture of turbine blades by lost-wax casting, wherein
   a core is provided, defining ducts extending between a root and a tip,
   a lower surface shell and an upper surface shell are provided,
   the lower surface shell and the upper surface shell are positioned on either side of the ducts of the core adjacent to the root,
   the lower surface shell and the upper surface shell are bonded around the core,
   the core equipped with the lower surface shell and with the upper surface shell is positioned in an injection mold,
   wax is injected around said core equipped with the lower surface shell and with the upper surface shell, so as to form a wax model comprising a blade airfoil and a blade root comprising a fir tree, the lower surface shell and the upper surface shell being positioned around the core so as to form a portion of the fir tree of the wax model.

2. The method according to claim 1, wherein the lower surface shell and the upper surface shell are made of wax or of polymer.

3. The method according to claim 1, wherein the lower surface shell and the upper surface shell are positioned around the core and are each in contact with said core, and wherein the lower surface shell and the upper surface shell are positioned so as to define a clearance comprised between 0.05 and 0.2 mm between them.

4. The method according to claim 1, wherein the lower surface shell and the upper surface shell are positioned around the core and are in contact with one another, the lower surface shell and the upper surface shell being dimensioned so as to allow a travel comprised between 0.05 and 0.2 mm relative to the core prior to their bonding around the core.

5. The method according to claim 1, wherein the core comprises at least 3 ducts extending between a root and a tip, and wherein the lower surface shell and/or the upper surface shell comprise bosses suited to be inserted between said at least 3 ducts, so as to index said shell relative to the at least 3 ducts.

6. The method according to claim 1, wherein the lower surface shell and the upper surface shell are positioned around the core in a region of the core wherein the wax model comprises walls having a thickness comprised between 1 and 10 times the thickness of the ducts of the core.

7. The method according to claim 1, comprising a prior step of manufacturing the lower surface shell and the upper surface shell by additive manufacturing.

\* \* \* \* \*